United States Patent [19]

Blackwell et al.

[11] Patent Number: 4,710,870

[45] Date of Patent: Dec. 1, 1987

[54] CENTRAL COMPUTER BACKUP SYSTEM UTILIZING LOCALIZED DATA BASES

[75] Inventors: Catherine A. Blackwell, Franklin Township, Somerset County; Raman Lakshmanan, Edison Township, Middlesex County; Mahadevan Subramanian, Fair Haven, all of N.J.

[73] Assignee: Bell Communications Research, Inc., Livingston, N.J.

[21] Appl. No.: 753,619

[22] Filed: Jul. 10, 1985

[51] Int. Cl.⁴ ............................................. G06F 15/16
[52] U.S. Cl. ................................................... 364/200
[58] Field of Search ... 364/200 MS File, 900 MS File, 364/300

[56] References Cited

U.S. PATENT DOCUMENTS 4,186,439 1/1980 Benson et al. ...................... 364/200

OTHER PUBLICATIONS

S. G. Chappell, F. H. Henig and D. S. Watson, "Automated Repair Service Bureau: The Front-End System," *The Bell System Technical Journal*, vol. 61, No. 6, Jul.-Aug. 1982, pp. 1165-1176.

Primary Examiner—Raulfe B. Zache
Attorney, Agent, or Firm—James W. Falk; John T. Peoples

[57] ABSTRACT

A distributed information backup system is disclosed. The inventive backup system includes a first computer which accesses data from a central data base and periodically distributes the data to a predetermined multiplicity of other computers upon request therefrom. Each of the other computers receives only a portion of the distributed data and thereupon updates a local data base with the data each receives. When the central data base is inaccessible, a data base user accesses one of the local data bases through one of the multiplicity of computers to obtain the data which it would ordinarily obtain from the central data base to perform his tasks.

12 Claims, 4 Drawing Figures

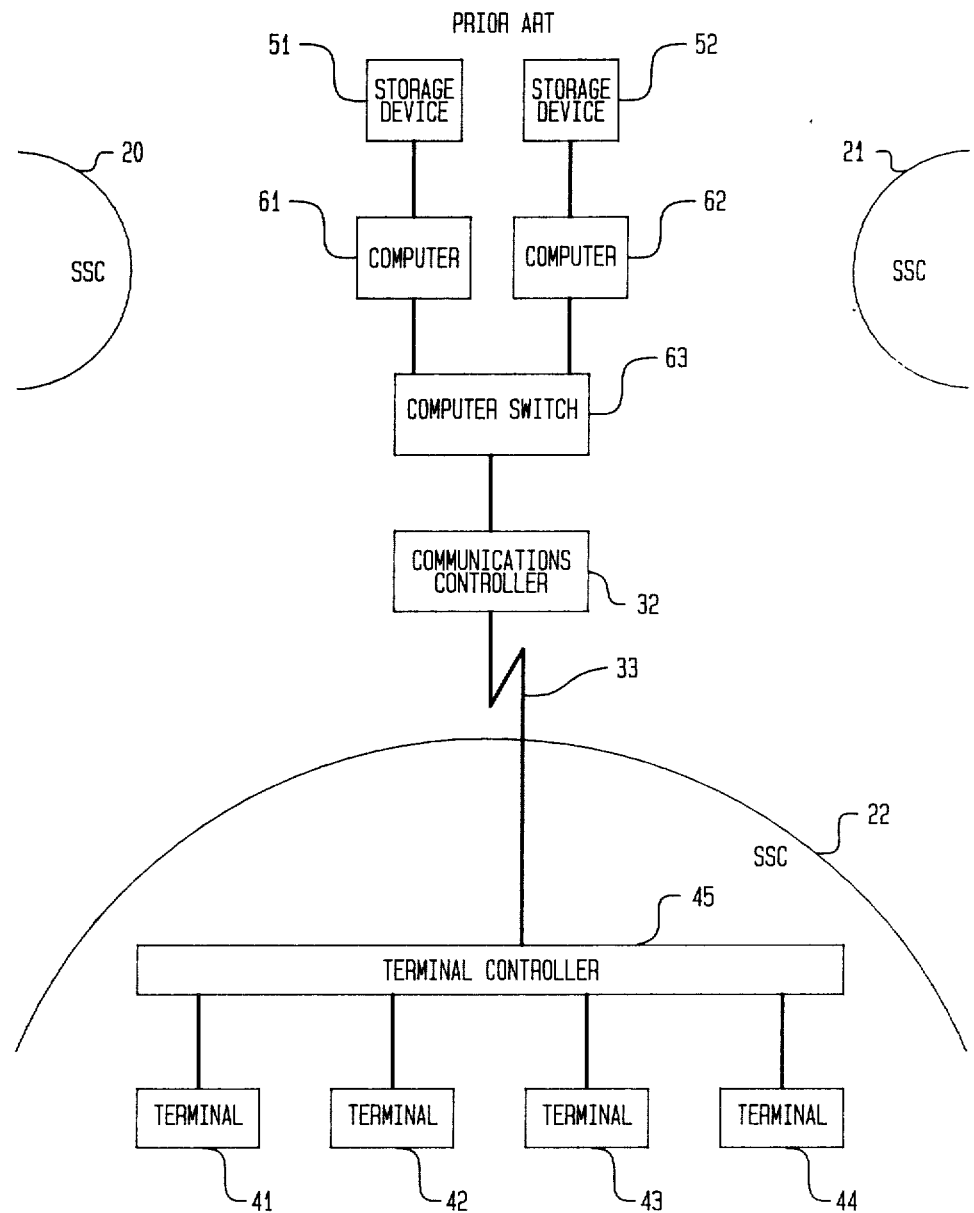

CENTRAL COMPUTER BACKUP SYSTEM UTILIZING LOCALIZED DATA BASES

BACKGROUND OF THE INVENTION

The present invention pertains to a distributed information backup system.

An enormous collection of data is required to carry out most administrative tasks in a technologically complex environment. In practice, such data originate in a large number of geographically dispersed locations. As such, many data base applications systems achieve advantages by storing the collection of data in a central data base. Through centralized storage, the efforts required to gather and administer the data, i.e. to update the data base, are greatly simplified and reduced. For these reasons, "main-frame" computer systems which store and provide access to enormous central data bases have been developed.

The data stored in such central data bases are often accessed by users who are located at many widely dispersed geographic locations. Access to the data is often critical for specific jobs being performed in the "field", i.e. many jobs simply cannot be carried out if the data in the central data base is not accessible to the geographically dispersed users. The central data base may be inaccessible for a variety of reasons, such as, hardware maintenance, data base updating, equipment failure and/or a failure in data communications between a user and the central data base.

To ensure data access, most data base systems provide a backup capability. In one typical system in the art, this backup is provided by duplicating the central data base itself. Alternatively, in other well-known systems in the art, backup is provided by duplicating the computer and/or communications facilities or by combinations of these two methods. Unfortunately, providing backup capabilities is expensive because of the extra hardware and software required for its implementation.

In other systems in the art, a central data base is accessed by users through one or more "front-end" processors which serve as a partial backup capability. These "front-end" processors only contain a small portion of the data that resides in the central data base. Thus, even if a user could access the "front-end" processors when the central data base was inaccessible, the data accessed by the "front-end" processor alone is minimal. This implementation is expensive and it is still vulnerable to failure in data communications.

Thus, a need exists for a reliable, inexpensive data base backup system that provides data accessibility when the centralized data base is inaccessible and when the communication link between users and the centralized data base is not operating properly.

SUMMARY OF THE INVENTION

Apparatus fabricated in accordance with the present invention advantageously provide a reliable, inexpensive distributed information backup system.

The inventive backup system includes a first computer which accesses data from a central data base and periodically distributes the data to a predetermined multiplicity of other computers upon request therefrom. Each of the other computers receives only a portion of the distributed data and thereupon updates a local data base with the data each receives—update includes such tasks as adding new data to the local data base and/or deleting or altering existing data in the local data base. When the central data base is inaccessible, a data base user accesses one of the local data bases through one of the multiplicity of computers to obtain the data which it would ordinarily obtain from the central data base to perform his tasks.

In one embodiment of the present invention, the data distributed and incorporated into the local data bases comprises a subset of all the data in the central data base, this subset being only enough data to provide users with the capability of performing their tasks for the short time during which the central data base is inaccessible to users.

In a second embodiment of the present invention, when updates to the data in the central data base occur, they cause the first computer to access only predetermined portions of the data from the central data base for distribution, the predetermined portions of data being specified by the updates to the central data base. In such an embodiment, the data stored in the local data bases comprises a subset of all the data in the central data base.

BRIEF DESCRIPTION OF THE DRAWING

A complete understanding of the present invention may be gained by considering the following detailed description in conjunction with the accompanying drawing, in which:

FIGS. 2a and 2b show, in pictorial form, a central data base system having a backup capability known to the art.

To facilitate reader understanding, identical reference numerals are used to designate elements common to the figures.

DETAILED DESCRIPTION

The present invention is best understood in the context of a specific application which utilizes an information backup system and will therefore be discussed in terms of the Circuit Installation and Maintenance Assistance Package (CIMAP).

CIMAP is a central data base system that mechanizes the overall administration, i.e. coordination and tracking, of installation and maintenance of message and special service circuits in a telephone network. In addition, it provides on-line information to assist in resolving circuit troubles. The Special Service Center (SSC) module in CIMAP provides on-line information, on request by users, to track trouble reports on special service circuits in various special service centers, i.e. locations which serve as administration and testing centers to coordinate activities concerning special service circuits in a geographical area. A telephone company requires twenty-four hour availability of the central data base in order to properly maintain special service circuits for two reasons: (1) many workers are assigned to an SSC for testing and repairing special service circuits; if the central data base is unavailable, then these workers are idle and an enormous expense is incurred and (2) if a trouble exists on a special service circuit which renders the circuit unusable for a substantial period of time, for example an hour, the customer receives a rebate on his bill; if the central data base is unavailable, the circuit cannot be repaired and substantial revenues are lost.

Consequently, in CIMAP, the main objective of a backup system is to guarantee accessibility of the information needed to administer the repair of special service circuits by personnel in the SSCs during those times when the central data base is inaccessible, for example during maintenance of the central data base system or during failure of the communication link between an SSC and the central data base system.

Figure 1:
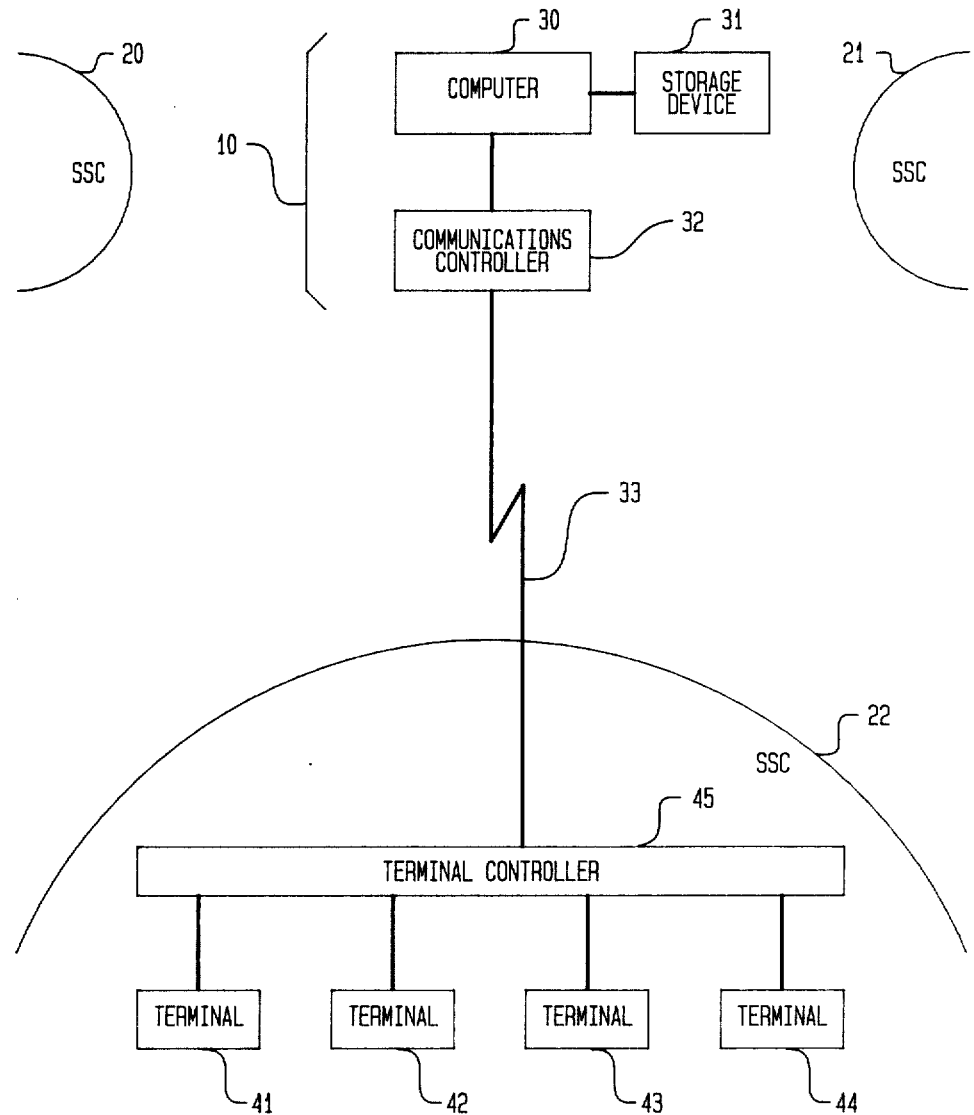
FIG. 1 shows, in pictorial form, a centralized data base system without backup.

Before describing the inventive backup system, we will first generally describe a typical central data base system operating without a backup system. FIG. 1 shows a central data base system 10 and several geographically dispersed SSCs 20, 21 and 22. The central data base system comprises computer 30, data base storage device 31 and communications controller 32. Computer 30 accepts data, formats and organizes it, and then transmits the data to storage device 31, for example an on-line disk storage system. Communications controller 32 interfaces communications link 33 from SSC 22 with computer 30.

Data access requests from SSC 22 are input into a multiplicity of user terminals 41–44. Terminals 41–44 are connected to terminal controller 45 which, in turn, interfaces with communications link 33. Thus, data access requests provided to terminals 41–44 are transmitted over communications link 33 to communications controller 32 and from there to computer 30. Computer 30 interprets the data access request and retrieves the information responsive to the request from storage device 31. The data is then transmitted through communication controller 32, over communications link 33, through terminal controller 45 to the terminal that originated the request. If communications link 33, communications controller 32, computer 30 and/or storage device 31 is inoperative, for any reason, the central data base is inaccessible to the terminals in SSC 22.

Figure 2A:
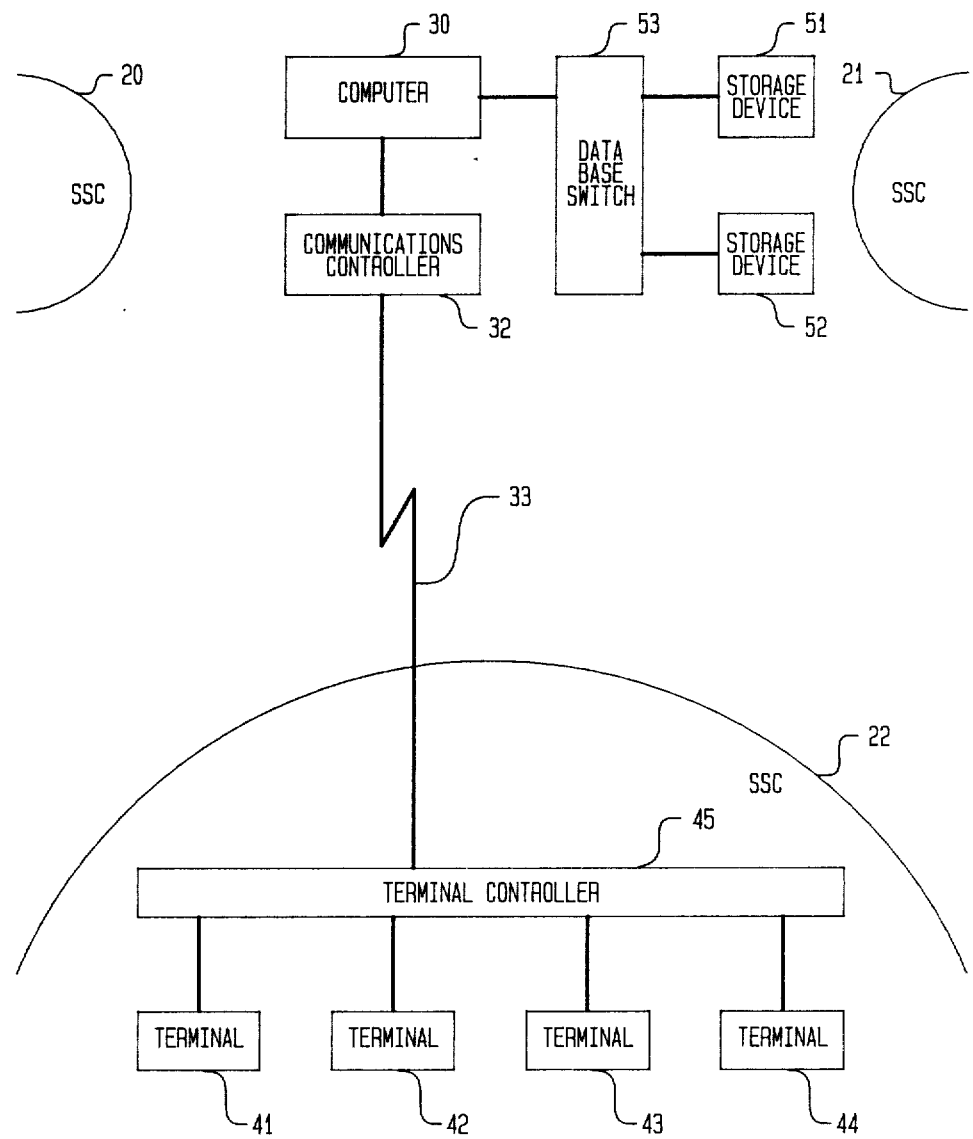

FIG. 2a shows one system known to the art for providing data base backup. In this system, computer 30 communicates with duplicate storage devices 51 and 52 through data base switch 53. Storage devices 51 and 52 both contain identical copies of the central data base. If either storage device fails, then computer 30 communicates with the other storage device, according to well-known methods, by means of data base switch 53. This system will protect against inaccessibility due to failure of either data base storage device. However, the data base in this system is still prone to inaccessibility caused by failure or unavailability of communications link 33, communications controller 32, computer 30 and/or data base switch 53.

FIG. 2b shows another system known in the art for providing data base backup. In this system, computers 61 and 62 are identical and are connected to identical storage devices 51 and 52, respectively. Communications controller 32 communicates with computers 61 and 62, according to well-known methods in the art, through computer switch 63. This system will protect against inaccessibility of the central data base due to failure of either computer 61 and storage device 51 or computer 62 and storage device 52. However, the data base in this system is still prone to inaccessibility caused by failure or unavailability of communications link 33, communications controller 32 and/or computer switch 63.

It is clear that duplication of the apparatus connected with the central data base, or even the communications network, substantially increases the cost of the entire central data base system. This large expense would be extremely burdensome for a company having relatively few SSCs among which the increased cost is shared.

The distributed information backup system embodying the principles of the present invention provides a backup system whose increased cost is largely determined by the number of distributed locations which it serves. Further, the inventive system protects against inaccessibililty of the central data base due to the unavailability of the computer, the storage device, the communication controller and/or the communications link.

Figure 3:
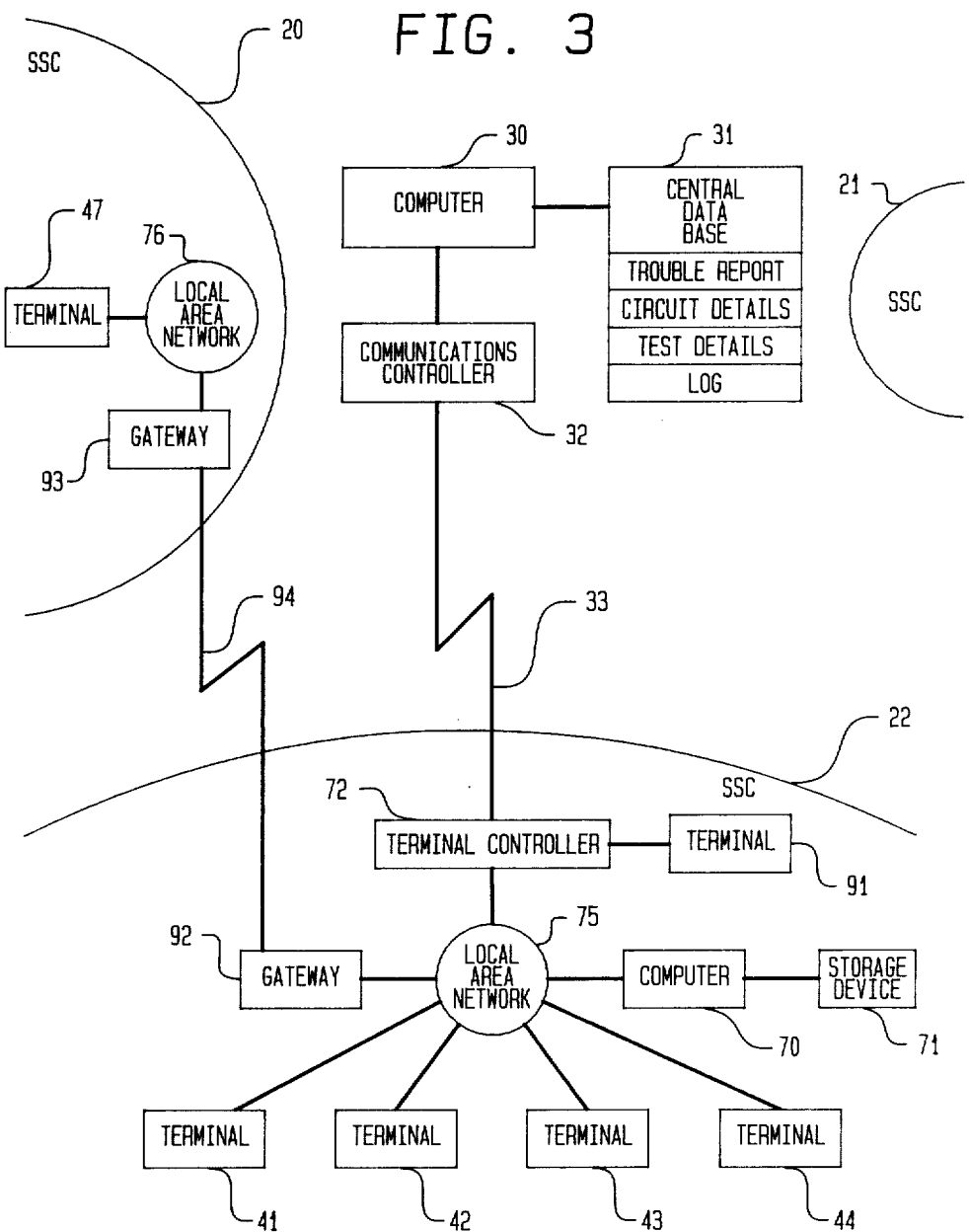
FIG. 3 shows, in pictorial form, a central data base system with a distributed data base backup system embodying the principles of the present invention.

When applied to CIMAP, the inventive information backup system is called the Short Outage System (SOS) and is shown in FIG. 3. (Note, the information backup system described below does not backup the entire CIMAP data base, but merely that portion which contains information used in testing and repairing troubles on special service circuits.) Here, communications controller 32 and communications link 33 function in the manner described above with respect to FIG. 1.

In this embodiment, computer 30, in addition to its previously described capabilities, includes a module which accesses data from the central data base and stores this data, grouped according to SSC, on storage device 31. Then, computer 30 distributes this data, over communications links, to the various SSCs in response to periodic requests from computers located in the SSCs, for example computer 70.

As shown in FIG. 3, computer 30 sends the data stored on storage device 31 to terminal controller 72 in SSC 22 over communications link 33. Terminal controller 72 interfaces with computer 70 and terminals 41–44 through local area network 75—such local area networks are well-known in the art.

Computer 70, illustratively a personal computer, uses the data to update a local data base on storage device 71, illustratively an on-line disk. As a result of such updating, new information is added to the local data base and/or existing information is deleted or altered. Note, the local data base stored on storage device 71 is not formed by merely copying the data distributed to SSC 22 onto storage device 71. Instead, the local data base is formed as the result of computer 70 updating the local data base with the incoming data. Since the local data base is updated, the distributed data merely comprises portions of the data contained in the central data base.

Terminal 41–44 are networked locally within SSC 22 by means of local area network 75. Local area network 75 provides user access to the central data base through terminal controller 72 in the manner described above with respect to FIG. 1 and access to the local data base stored on storage device 71 through computer 70. There are terminals in the SSCs, such as terminal 91, which are not connected to the local area network within an SSC and which communicate with the central data base directly by means of terminal controller 72. Further, terminals in SSCs other than SSC 22 can access data in the local data base stored on storage device 71. For example, terminal 47 in SSC 20 is connected to local area network 76 in SSC 20. Local area networks 75 and 76 are interconnected through communications link 94 and gateways 92 and 93—a gateway being a device which interconnects local area networks and is well-known in the art. Thus, by means of the connections shown in FIG. 3, a user in SSC 20 can access data on storage device 71.

In this embodiment of the inventive backup system, the data distributed to the SSCs and stored in the local data bases does not, when all taken together, comprise the totality of the data in the central data base. For example, the data does not include information on all the special service circuits in the telephone company. Instead, the data includes information on just those circuits which are in need of repair, and even then on those circuits, only the portions of the circuit data relevant to the testing and repair. In addition, the data includes all the information necessary to enable personnel in the SSC to perform the essential repair administration tasks with regard to those circuits that they would be able to perform if the central data base were accessible.

The manner in which the inventive backup system operates is best understood in the context of the special service circuit administration described briefly above. When notification of a trouble on a special service circuit is received at computer 30, the computer produces a trouble ticket, i.e. an administrative indication of a trouble on a circuit. Computer 30 then updates the central data base trouble ticket file and accesses the central data base on storage device 31 to gather the specific information required for the repair work and for the administration of the repair work. This information, i.e. trouble reports, circuit test details, circuit layout details and a trouble ticket log, as shown in FIG. 3, is stored on storage device 31 according to the SSC which will administer the repair. Inasmuch as this information is essential to performing maintenance, SSC personnel must have access to this information from the backup system when the central data base is inaccessible.

As described, computer 30 groups the information on storage device 31 according to the SSC for which it is pertinent. Then, computer 30 distributes the data to the SSCs in response to periodic requests from the computers in the SSCs, for example every four (4) minutes. Only the information pertinent to a specific SSC is sent thereto and a record is kept of which data was sent to which computer. This enables computer 30 to resend data upon request if something interfered with proper transmission the first time. Upon receipt of the information from the central data base that is pertinent to SSC 22, computer 70 updates the local data base on storage device 71.

The above-described distribution of information from the central data base to the distributed local data bases goes on continuously. If the central data base is inaccessible from SSC 22, for any reason, then personnel can use terminals 41-44 to obtain the data they need by accessing the local data base stored on storage device 71.

When the central data base is accessible and a trouble on a circuit has been cleared, i.e. the circuit has been repaired, the trouble ticket must be closed in the central data base—not removed, but merely assigned the status corresponding to "trouble resolved". However, the trouble ticket must be removed from any local data base in which it is stored. For SSC 22, this is accomplished by computer 30 transmitting a "delete" request to computer 70 during the period of time when the next batch of data is sent from the central data base to SSC 22.

The work performed in the SSC with the aid of the backup system, i.e. during the time the central data base is inaccessible, is logged into the backup system by computer 70 and stored on storage device 71. When the central data base becomes accessible again, the log of work performed during this time is sent, via local area network 75, terminal controller 72, communications link 33, and communications controller 32 to computer 30 so that the central data base can be updated.

The above-described process can also be illustrated in terms of the following steps:

WHEN THE COMPUTER 30 IS ACCESSIBLE

Step 1: Computer 30 receives notice of trouble on a circuit, generates a trouble ticket, and adds the trouble ticket to the central data base.

Step 2: Computer 30 determines which SSC will administer the testing and repair on the circuit, gathers the information needed for that task from the central data base, and stores that data, according to SSC, on storage device 31.

Step 3: Computer 30 receives notice that a trouble on a circuit has been cleared, closes the trouble ticket in the central data base, and stores a "delete" for that trouble ticket, according to SSC, on storage device 31.

Step 4: Computer 30 receives a report from the field concerning the status of a trouble ticket, inserts this new information on the trouble ticket stored in the central data base, and stores an "alter" for that trouble ticket, according to SSC, on storage device 31.

Step 5: Computer 30 receives a periodic request for data from a SSC, for example from computer 70 in SSC 22, and transmits the data stored on storage devices 31 for SSC 22 thereto.

Step 6: Illustratively, computer 70, in SSC 22, receives the above-described data from computer 30 and updates the local data base stored on storage device 71— adds a trouble ticket and the associated data to the local data base or deletes a trouble ticket and the associated data from the local data base or alters a trouble ticket on the local data base.

WHEN COMPUTER 30 IS INACCESSIBLE

Step 1: Illustratively, computer 70 recognizes that computer 30 is inaccessible and signals the users. A user accesses computer 70 via terminal 41 in SSC 22 to obtain the status of a trouble ticket and the associated information.

Step 2: Illustratively, user accesses computer 70 via terminal 41 in SSC 22 to resolve a trouble ticket or report the status of the trouble, computer 70 stores an indication of the closed trouble ticket or the status on storage device 71.

WHEN COMPUTER 30 BECOMES ACCESSIBLE AFTER A PERIOD OF INACCESSIBILITY

Step 1: Illustratively, computer 70 recognizes that computer 30 is accessible and signals the users. Computer 70 accesses the "delete" and "status" information and transmits it to computer 30 so that computer 30 can update the central data base.

Thus, as described above, the inventive information backup system allows the users in the SSCs to perform their work if the central data base is inaccessible because of a failure in the central equipment or due to a failure in the communications link between the central data base and one, some or all of the SSCs.

It should also be clear to those skilled in the art that further embodiments of the present invention may be made by those skilled in the art without departing from the teachings of the present invention. For example, the periodic request for the distribution of data could be generated in computer 30 instead of the computers located in the SSCs.

What is claimed is:

1. Information backup apparatus for a primary data base stored in a primary storage system comprising
   a plurality of storage means each containing a secondary data base,
   means, connected to said plurality of storage means, for accessing each said secondary data base, and
   means, connected to said means for accessing and the primary storage system, for responding to input information provided by a direct user of the primary data base, for extracting data from the primary data base in response to said user input, for processing and storing data related to said extracted data in predetermined groups in the primary storage system, and for periodically distributing said predetermined groups of data to predetermined ones of said storage means to update each said secondary data base with corresponding data from said predetermined groups.

2. Apparatus in accordance with claim 1 wherein the means connected to said means for accessing and the primary storage system comprises a computer and the primary storage system comprises disk storage means.

3. Apparatus in accordance with claim 1 wherein said means for accessing each said secondary data base comprises a computer.

4. Apparatus in accordance with claim 3 wherein the means for periodically distributing comprises a further computer which accesses one of said predetermined groups of data stored on the primary storage system and transmits said one of said predetermined groups to said means for accessing each said secondary data base in response to a periodic request therefrom.

5. Apparatus in accordance with claim 3 wherein the means for periodically distributing comprises a further computer which periodically accesses one of said predetermined groups of data stored on the primary storage system and transmits said one of said predetermined groups to said means for accessing each said secondary data base.

6. Apparatus in accordance with claim 1 wherein the means connected to said means for accessing and the primary storage system comprises means for receiving updates to predetermined data in the primary data base in response to said input information and means for accessing other predetermined data from the primary data base in further response thereto.

7. Apparatus in accordance with claim 6 wherein the means for accessing each said secondary data base comprises means for receiving data from a data entry device, the data having a relation to data already contained in a secondary data base, updating the secondary data base in response to receiving such data, storing such data on a storage device, and transmitting such data to means for updating the primary data base.

8. A method of information backup for a data base which comprises the steps of:
   in response to information supplied by a direct user of the data base, accessing the data base when predetermined data is added thereto by the user to retrieve other predetermined data,
   processing and storing the predetermined data and the other predetermined data in predetermined groups of data into the data base,
   periodically transmitting the predetermined groups of data to predetermined ones of a multiplicity of means for updating local data bases with data from the predetermined groups, and
   updating the local data bases with the predetermined groups of data.

9. The method of claim 8 wherein the step of periodically transmitting comprises the step of transmitting the data from one of the predetermined groups in response to a periodic request from one of the multiplicity of means for updating.

10. The method of claim 8 which further comprises the steps of:
    when the data base is inaccessible, receiving data having a relation to data aleady contained in each of the local data bases, updating each of the local data bases with such data, and storing such data and
    when the data base becomes accessible, transmitting such stored data to means for updating the data base.

11. An arrangement for providing information back up for a centralized data base having stored therein data related to a remote location comprising
    a storage device at the remote location containing a local data base, said local data base comprising some but not all of the data in said centralized data base,
    a plurality of terminal equipments,
    a local area network connected to said terminal equipments,
    means, connected to said local area network and said storage device, for accessing said local data base, and
    means, connected to said local area network and said centralized data base, for periodically distributing a predetermined group of said data from said centralized data base to said means for accessing to update said local data base with said data from said predetermined group, said distributing means including a centralized computer connected to a storage device containing said centralized data base and communication means for interconnecting said local area network and said centralized computer,
    wherein each of said terminal equipments may access said local data base through said local area network.

12. A method of information back up for a central computer system including a central storage device for storing a a cebtrakuzed data base having sloted therein data related to a remote location comprising the steps of
    accessing the system to obtain a subset of data from the centralized data base, processing said subset in the system to produce a predetermined group of data, and storing said predetermined group in the centralized data base,
    periodically transmitting said predetermined group of data from said central system to a local system at the remote location, and
    updating in said local system a local data base with said predetermined group, said local data base being smaller than the centralized data base.

* * * * *

UNITED STATES PATENT AND TRADEMARK OFFICE
CERTIFICATE OF CORRECTION

PATENT NO. : 4,710,870

DATED : December 1, 1987

INVENTOR(S) : Catherine A. Blackwell, Raman Lakshmanan and Mahadevan Subramanian It is certified that error appears in the above-identified patent and that said Letters Patent is hereby corrected as shown below:

Column 8, line 53, "cenbtrakuzed" should read --centralized--; line 53, "sloted" should read --stored--.

Signed and Sealed this

Nineteenth Day of July, 1988

Attest:

DONALD J. QUIGG

*Attesting Officer*     *Commissioner of Patents and Trademarks*